Figure 1:
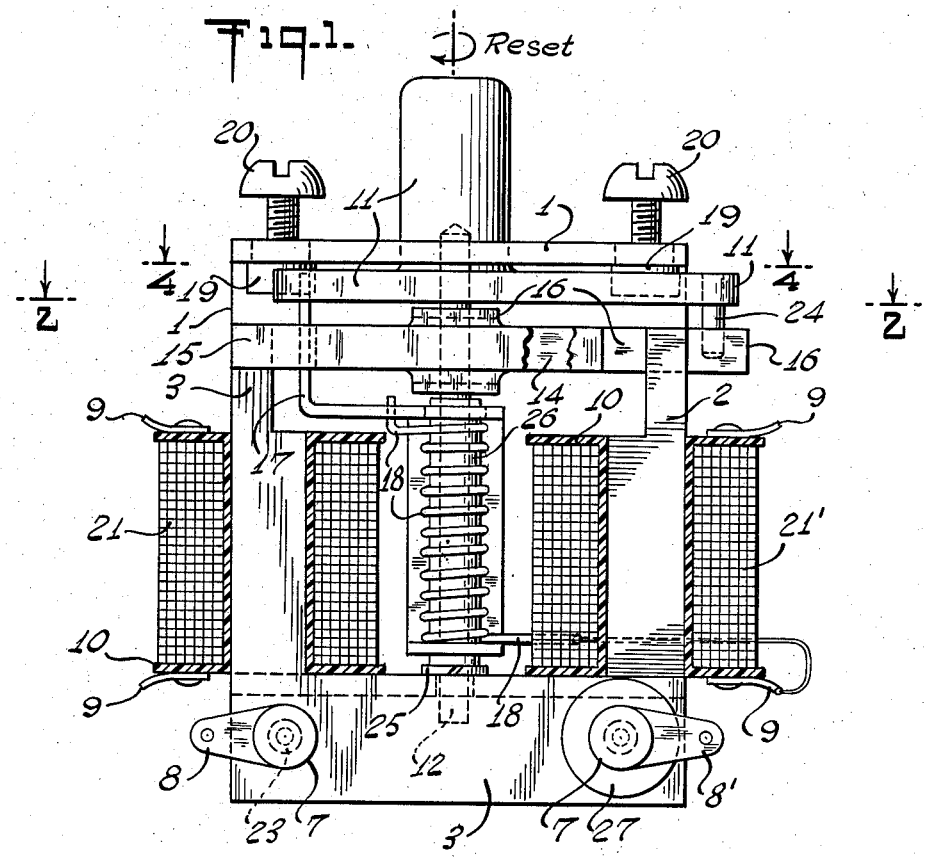

Aug. 13, 1963    N. B. WALES, JR    3,100,825
MAGNETIC RELEASE STRUCTURE
Filed Nov. 1, 1960    2 Sheets-Sheet 1

INVENTOR
NATHANIEL B. WALES JR.
BY
ATTORNEY

Aug. 13, 1963 N. B. WALES, JR 3,100,825
MAGNETIC RELEASE STRUCTURE
Filed Nov. 1, 1960 2 Sheets-Sheet 2
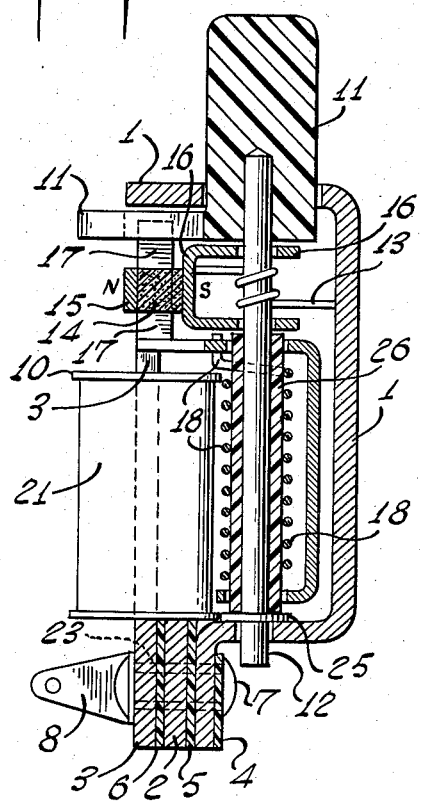
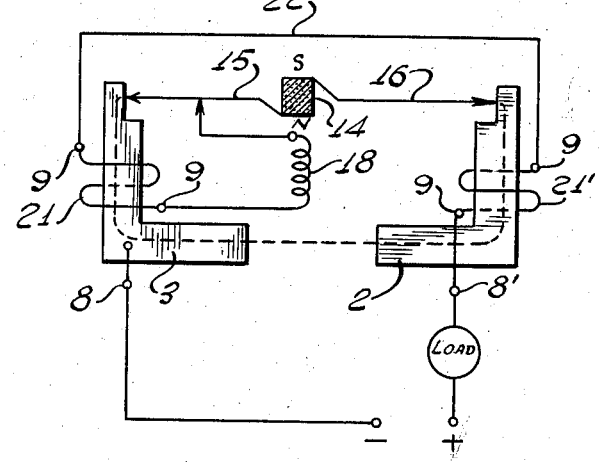
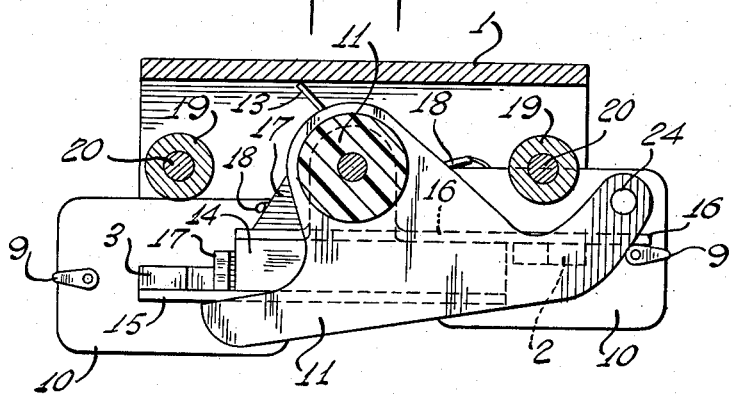
INVENTOR
NATHANIEL B. WALES JR.
BY
ATTORNEY

United States Patent Office 3,100,825
Patented Aug. 13, 1963

3,100,825
MAGNETIC RELEASE STRUCTURE
Nathaniel B. Wales, Jr., Sharon, Conn., assignor to The Metrodynamics Corporation, a corporation of New Jersey
Filed Nov. 1, 1960, Ser. No. 66,462
3 Claims. (Cl. 200—93)

This invention relates to devices such as circuit breakers and electromechanical output devices for computers, in which stored mechanical energy is released in response to an electrical signal.

It is old in the art to take advantage of the large forces appearing across closed magnetic gaps by causing such forces to restrain the stored mechanical energy of a weight or spring from acting on a moveable armature until an electrical signal is made to diminish the magnetic flux across the gap and thereby release a large amount of mechanical energy in response to a small amount of electrical signal energy.

However, the speed of action and sensitivity to small release signals of such devices have heretofore been restricted by the necessity of controlling the magnitude and duration of magnetic field reversal so as not to recapture the armature.

The present invention overcomes this limitation by a magnetic structure in which the moveable armature itself is made to comprise a source of magnetomotive force which is shunted by a leakage path of relatively low reluctance. This concept accomplishes four desirable ends.

First, it furnishes the magnetic holding flux so that no electromotive power need be supplied in the stand-by condition.

Secondly, it removes the previous limitations of the magnitude of flux reversal by not only dropping the holding force on the armature to zero as the opposing signal flux overcomes the holding flux, but also by generating a magnetic repulsive force which supplements the mechanical force due to the stored energy of the spring or weight, thereby greatly increasing the available acceleration of the armature.

The third benefit of this structure is that the shunting leakage path taught by my invention causes a substantial increase in the rate of change of holding flux with increasing gap, thereby decreasing the required signal pulse length for effecting release of the stored energy.

The fourth advantage of the subject configuration is that it comprises a magnetic circuit which provides low inductance to the signal coil, thereby improving the time constant of the system.

In the preferred embodiment of my invention, the source of magnetomotive force is supplied by a ceramic ferromagnetic material having a high value of coercive force coupled with a low value of permeability.

Such magnetic materials are used to best advantage in thin sections relative to the direction of flux due to their low permeability and, therefore, are ideally adapted for the geometry of my invention which calls for a self-short circuiting magnetic shunt to hasten the space rate of diminution of magnetic forces as the gap widens.

The self-holding repulsor armature of the subject invention for a given energy release rating reduces the required pulse length by a factor of at least four over the equivalent conventional design, while reducing the power requirement by a factor of ten or more.

This improved performance has made it possible to attain a speed of release on the order of 100 microseconds. This makes it suitable for such applications as the circuit breaker disclosed in the accompanying drawings as the preferred embodiment of my invention.

This circuit breaker is particularly valuable as a meter protector and will repeatedly protect a 50 microampere D'Arsonval meter movement from 50,000% overloads.

To obtain this speed of operation, the current from the load to be protected is passed directly through the area of magnetic contact between the moveable armature and a stationary magnetic pole.

Further, in order to use the armature and a pole as an electric switch, the cooperating return magnetic circuit includes an insulating transfer gap of large area so as to electrically, but not magnetically, isolate the pole from the armature when the release of the manually stored spring energy has been effected by the signal provided by the overload.

An additional feature of this invention is the provision of a safety switch coupled to the manual reset knob so that during a reset operation the load is independently disconnected from the current source until the reset is completed and the knob is manually released.

This switch thus assures that if reset is attempted while the overload condition still persists, the device to be protected will not be subjected to this overload during reset, and that the circuit breaker on manual release of its reset knob will subsequently trip again.

It is an object of this invention to provide an improved magnetic structure for releasing mechanically stored energy to do work in response to very short low powered electrical signals.

Another object is to provide a magnetic release structure which requires no stand-by power, operates with large flux reversals, exhibits a high rate of change of magnetic force with gap increase, and which presents a low impedance to input signals.

A third object is to provide a design of circuit breaker which will be fast, sensitive, and inexpensive to manufacture.

A fourth object is to provide automatic means in a circuit breaker to prevent current from flowing to the load during the reset operation.

An additional object is to provide a release structure adapted to receive information from short low level pulses delivered from a computer.

Other objects are implicit in these specifications and claims.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

Figure 2:
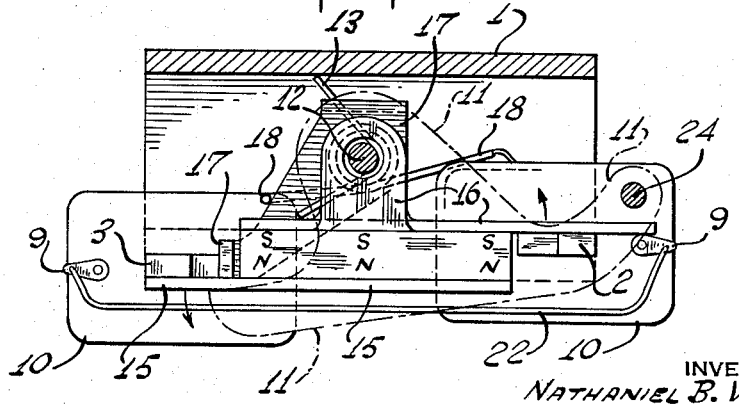

In the drawings, wherein like reference characters denote corresponding parts throughout the several views:

FIG. 1 is a view in elevation of a circuit breaker incorporating the principles of this invention, FIG. 2 is a plan section through 2—2 of FIG. 1, FIG. 3 is a central section through 3—3 of FIG. 1, FIG. 4 is a plan section through 4—4 of FIG. 1, and FIG. 5 is a schematic diagram of the circuit breaker and its load.

Referring to FIGS. 1 through 4, the frame 1 is made of a non-magnetic material such as an aluminum alloy. Frame 1 forms the lower journal for a non-magnetic shaft 12 which is force fitted into the plastic insulating integral reset knob and lever 11.

Knob-lever 11 is journalled in the upper shelf of frame 1 and the reset assembly 1, 11 is prevented from axial motion by E ring collar 25.

The armature pivot pole 16 is loosely journalled on shaft 12 and is cemented by an epoxy type adhesive to the ceramic magnet 14 which, in turn, is cemented to the contacting armature pole 15.

The material composing ceramic magnet 14 is chosen to have a high value of coercive power and a low value of permeability, and is magnetized across its short axis so that its south pole is coincident with pole piece 16 and its north pole is coincident with pole piece 15.

Pole pieces 15 and 16 are made of a highly permeable magnetic material and are preferably nickel plated to prevent corrosion and to improve their electrical conductivity without introducing an appreciable magnetic gap.

Consequently, the assembly 15—14—16 comprises a moveable armature containing a source of magnetomotive force and an integral magnetic shunt formed by the relatively large areas and short separation of the highly permeable pole pieces 15 and 16. Evidently, this shunt may be further enhanced by extending pole pieces 16 and/or 15 towards one another to form additional leakage paths, if desired.

It is to be noted that the approximately balanced design of the armature shown was chosen in preference to a linear type of displacement to improve the immunity of the device to vibrational accelerations. If a severe environment is anticipated it is evident that the design of FIG. 1 could be modified to provide exact counterbalance.

The armature assembly 15—14—16 is lightly biased by a torque supplied by spring 13 mounted on shaft 12 between the journal ears of pole 16 and reacting against frame 1 so as to tend to rotate the armature counterclockwise as seen in FIG. 2.

Also freely mounted on shaft 12 is the insulating sleeve 26 to which the non-magnetic metal safety switch reset bail 17 is frictionally secured.

The energy storing torque spring 18 is freely mounted around sleeve 26 and is formed to react between a fixed insulated stop at its lower end, and the contact arm of bail 17 at its upper end so as to produce a strong counterclockwise torque on bail 17 about shaft 12 as seen in FIGS. 2 and 4.

The torque of spring 18 causes the upper contacting arm of bail 17 to push against the end of pole 15 beyond magnet 14 and so that transfer its torque to the armature assembly.

The stationary magnetic circuit is formed by the inner L-shaped pole piece 2 and the outer contacting L-shaped pole piece 3. Besides being highly permeable, the material and preparation of all the pole pieces 2, 3, 15 and 16 is chosen to have a low value of residual magnetism.

The frame 1, and poles 2 and 3 are electrically insulated from one another by the thin insulating shims 4, 5, 6 and 27, and the insulating sleeves 22. The entire stator assembly is secured together by the rivets 7.

Lug 8 is electrically connected to pole 3 and at the right lower side of FIG. 1 is provided with a washer 27, while lug 8' is electrically isolated from the poles and frame.

The threaded inserts 19 secured to frame 1 afford a three hole panel mounting for the circuit breaker by means of screws 20.

The two signal field coils 21 and 21' are wound on bobbins 10 and secured about poles 3 and 2, respectively. Lugs 9 secured to bobbins 10 form the coil terminals.

As seen in FIG. 5 the electrical circuit of the device passes serially from terminal lug 8 to contacting pole 3, to contacting armature pole 15, to contacting torque bail 17, and, via spring 18, through the two coils 21 in series-aiding connection to the terminal lug 8.

When the integral reset knob-lever 11 is manually rotated clockwise as seen in FIG. 4, the left extension of the lever first lifts the upper end of bail 17 from contact with armature pole 15, thereby positively interrupting the circuit through the device so that no damage can be done to the load to be protected during the reset operation.

On further counterclockwise rotation of knob 11, reset pin 24 secured to the right lever extension of 11 contacts the outer end of armature pole 16 and presses it into contact with the top of stator pole 2. Further pressure on pin 24 then causes the outer end of armature pole 15 to contact the top of stator pole 2 against pole 16. This is made possible by the loose fit of the armature journal member 16 on shaft 12.

The magnetic circuit is then closed, and flux emanating from magnet 14 passes through poles 15, 3, 2, and 16 to re-enter the magnet and thereby set up a powerful force in both gap 15—3 and gap 16—2. This magnetic force couple is sufficiently strong that when knob 11 is manually released, thereby allowing bail 17 to recontact pole 15 and re-establish the torque of spring 18 on the armature rotor, this rotor will remain locked to the stator poles by the permanent flux of magnet 14.

The purpose of bias spring 13 is to insure that when reset lever 11 contacts bail 17, the armature will not follow it in the resetting sequence.

The operation of the device is as follows:

When the circuit breaker is connected in series with a load device such as a meter, as shown in FIG. 5, the load current flows through the two series coils 21, 21' in a direction such as to generate a flux in the magnetic circuit tending to oppose the holding flux of magnet 14.

For normal meter currents the ampere turns of opposing magnetomotive flux is designed to be insufficient to diminish the holding flux to the point of release under the torque of spring 18.

However, if the current rises to the danger point, say 200% overload for a low current highly damped meter, the design parameters are chosen so that the opposing coil flux produces a net reversal of flux in the magnetic circuit, and the armature due to the high coercive power of magnet 14, is repelled from the stationary poles 2 and 3.

Since it takes a finite time for the flux to change after the opening of the circuit by the motion of pole 15 away from pole 3, this repulsion will continue for a significant number of microseconds while the opposing field is collapsing.

If this were not so, the device would oscillate in the manner of a buzzer. It is because of this danger of buzzer action that it is important, in this circuit breaker embodiment of my invention, that the magnetic force diminish very rapidly with separation of the poles 3 and 15.

This high space rate of force diminution is provided by the magnetic shunt made possible in the design of FIG. 1 by the use of a low permeability material permitting the close spacing of the larger area pole faces 15 and 16. With this geometry and selection of magnetic properties, measurements on test devices so constructed show that the holding force has dropped to one half its seated value in a movement of .0003 inch pole separation.

As a consequence, the armature, under the double acceleration of the spring and the repulsion of the reversed field, is able to move away from the stationary pole a sufficient distance so that the magnetic circuit loses mechanical control, and the subsequent collapse of the opposing field due to the opening of the contacts 3—15 cannot recapture the receding armature.

The overload has, in the manner described, released the armature and positively interrupted the circuit.

Manual resetting, as previously recited, first disconnects from the load any overload condition which may persist, by the action of the auxiliary safety switch contacts 15—17, and then forces the armature back into the holding condition where switch contacts 3—15 are closed.

On manual release of knob 11, contact-torque arm 17 recloses the safety switch so that the circuit breaker can reoperate to protect the load in the event that the overload condition is still present.

For instance, the energy stored in the equivalent of spring 18 can be supplied by a solenoid instead of manually, and the release of the armature assembly 15—14—16 could be made to act as a stop for printing racks in a computer output device, or to act as a one-revolution clutch release in response to a logic level signal to coils 21, 21'.

It is to be noted that if the material of magnet 14 is also an electrical insulator, the insulator shim 6 may be omitted, and if desired, the poles 2 and 3 can be made in one piece.

As many changes can be made in the above circuit breaker and in the means for applying the principle of my magnetic release structure to widely different embodiments of the invention, without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a circuit breaker for protecting an electrical load from its power source the combination comprising a moveable armature having a first pole and a second pole, a first source of magnetomotive force acting in said armature, a magnetic shunt across said armature, a first stationary pole, a second stationary pole, means to electrically insulate said first armature pole from said first stationary pole when they are not in physical contact, a stationary magnetic circuit coupling said first stationary pole to said second stationary pole, means for urging the first pole of said armature to move away from the said first stationary pole, restoring means to bring the poles of said armature into magnetic holding relation to said stationary poles and to bring said first armature pole into electrical contact with said first stationary pole, circuit means for connecting said electrical load, the said power source for said load and the switch formed by said first armature pole and said first stationary pole in series relation, and means responsive to the magnitude of electrical current flowing in said circuit means for generating a second magnetomotive force opposing said stationary magnetic circuit.

2. In a circuit breaker according to claim 1, a second normally closed switch operated by said restoring means and inserted in series relation to said circuit means whereby to disconnect said load from said power source during the restoring operation.

3. In a circuit breaker according to claim 1, secondary switch means operative by said restoring means and including said urging means for disabling said circuit means during the operation of said restoring means.

References Cited in the file of this patent
UNITED STATES PATENTS

| | | |
|---|---|---|
| 2,825,783 | Sauer | Mar. 4, 1958 |
| 2,892,055 | Wantosch | June 23, 1959 |
| 2,897,415 | Stockl | July 28, 1959 |
| 2,913,639 | Coppola | Nov. 17, 1959 |